Dec. 26, 1967     J. SENEDIAK     3,359,581

KEY THREADING DEVICES

Filed June 8, 1965

Inventor:
Joseph Senediak
By Walter C. Kroly
Atty.

United States Patent Office 3,359,581
Patented Dec. 26, 1967

3,359,581
KEY THREADING DEVICES
Joseph Senediak, 3523 S. Clinton Ave.,
Berwyn, Ill. 60402
Filed June 8, 1965, Ser. No. 462,225
5 Claims. (Cl. 10—10)

ABSTRACT OF THE DISCLOSURE

A method and means for producing threaded articles, such as nuts, bolts and the like. A first member is snugly disposed within a second member, with one of the members (the tool) having one or more thread cutting elements, and the other member (the article to be threaded) having a like number of grooves for receiving the elements. The two members are subjected to relative rotation through an angle equal to 360° divided by the number of thread cutting elements.

This invention relates to the production of threaded articles, such as nuts and bolts and analogous articles and has to do with means for and a method of producing such articles having cut threads.

It is the present practice in producing nuts, bolts and analogous articles having cut threads to employ several screw taps or analogous members, requiring several operations with corresponding delay in producing the finished article. It is important, in many instances, that the threads of nuts and bolts be accurate and formed with precision and in such cases threads formed by swaging or pressing operations do not meet the required standards.

My invention is directed to the production of nuts, bolts and analogous articles having accurately formed cut threads, and to the production of such articles at higher speeds than is possible under the known practice above referred to. To that end I provide means whereby threads of a nut or bolt, or like article may be rapidly and accurately cut to the desired depth without necessity for subjecting the parts to multiple rotation during the cutting operation. Further objects and advantages of my invention will appear from the detailed description.

Figure 1:
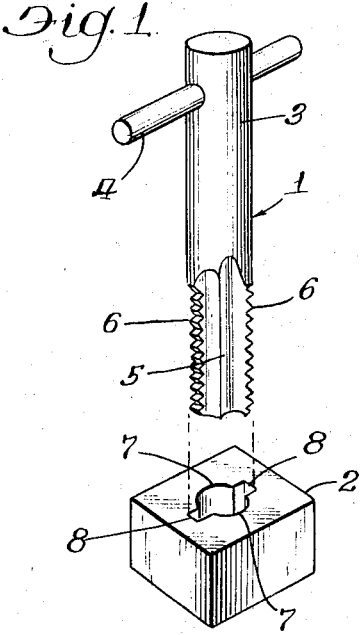
FIGURE 1 is an exploded or disassembled view of two members used in producing a nut in accordance with my invention.
Figure 2:
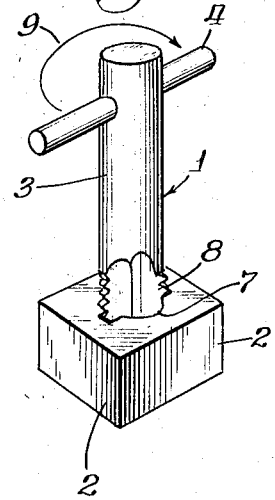
FIGURE 2 is a perspective view of the two members of FIGURE 1 disposed in cooperating relation preliminary to the thread cutting operation.
Figure 3:
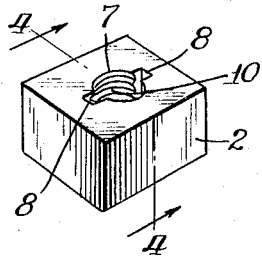
FIGURE 3 is a perspective view of a nut produced by the two members of FIGURES 1 and 2.
Figure 4:
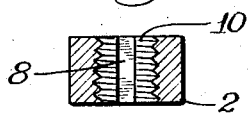
FIGURE 4 is a sectional view taken substantially on line 4—4 of FIGURE 3.

In FIGURES 1 and 2 I have shown two cooperating members 1 and 2. The member 1 is, in general, similar to a hand tap comprising an upper cylindrical handle portion 3 through which is secured a pin or handle 4, assuming the tap 1 to be manually operated, although it will be understood that my invention comprehends a power driven tap or analogous member. The member 1 is provided with a cylindrical lower portion or shank 5 of reduced diameter having at each side thereof a series or row of thread cutting elements 6 of proper depth and pitch and extending substantially parallel with the axis of member 1. The member 2 is provided with a cylindrical bore 7 of substantially the same diameter as stem 5 of member 1, and is further provided, at diametrically opposite sides of bore 7, with a groove 8 opening outwardly from bore 7. In performing the threading operation, the stem 5 of member 1 is inserted into bore 7 of member 2, in which it has a snug fit. with the two series of cutting elements 6 extending into the grooves 8, as shown in FIGURE 2. With the members 1 and 2 assembled in cooperating relation, the member 1 is turned in clockwise direction, as indicated by the arrow 9, while the member 2 is held against rotation in a suitable manner, for instance by being gripped in a vise. The member 1 is turned through approximately 180°, during which the cutting elements 6 cut the threads 10 in member 2 extending between the sides of the grooves 8, the cutting elements 6 then begin entering grooves 8 and the member 1 being withdrawn axially from the member 2. The member 2 is thus provided with accurately cut interior threads 10 of desired pitch and depth interrupted by the grooves 8, which do not objectionably affect the efficiency of the threaded member 2 as a nut. In that manner the member 2 is threaded interiorly by a single turn of the cutting member 1 through approximately 180° and with the use of but one thread cutting member, the operation being quickly performed and rendering possible greatly increased production compared to present practice. While the operation has been described as performed manually, by way of illustration only, it will be understood that it may be performed by high speed machines.

Figure 5:
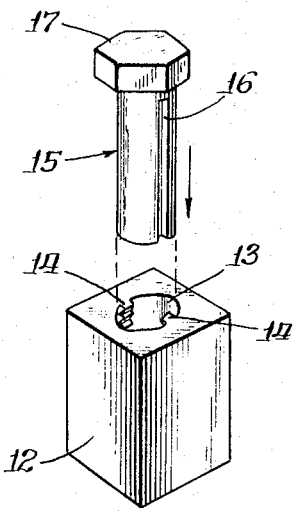
FIGURE 5 is a view similar to FIGURE 1 but showing a modified form of my invention.
Figure 6:
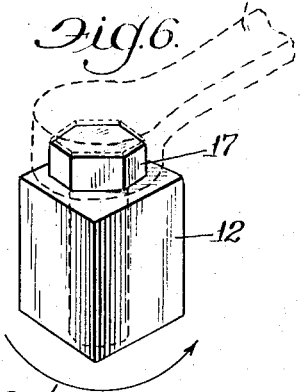
FIGURE 6 is a view showing the two members of FIGURE 5 in assembled cooperating relation preliminary to the thread cutting operation.
Figure 7:
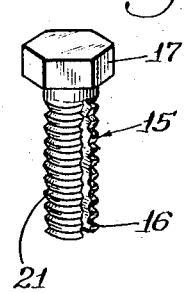
FIGURE 7 is a perspective view of a threaded bolt produced by the two members of FIGURES 5 and 6, respectively, in accordance with the method of my invention.

In the modified form of my invention shown in FIGURES 5 and 6, the thread cutting member 12 is in the form of a block having a central cylindrical bore 13 provided at diametrically opposite sides thereof with a series of thread cutting elements 14 projecting inwardly of bore 13 and generally corresponding to the thread cutting elements 6 of FIGURE 1. The part to be threaded is in the form of a bolt blank 15 of cylindrical form and of a diameter to fit snugly in bore 13 of member 12, member 15 having at diametrically opposite sides thereof an outwardly opening lengthwise groove 16 parallel with the axis of member 15 and adapted to receive the series of cutting elements 14. Member 15 is provided at its upper end with a hexagonal head 17. In performing the threading operation the shank or body portion of member 15 is inserted into bore 13 of member 12, with the series of cutting elements 14 extending into the grooves 16, as shown in FIGURE 6. With the parts assembled in cooperating relation, the member 15 is held against rotation by a suitable tool, indicated in broken lines at 18, fitting snugly about head 17, and the member 12 is then turned through approximately 180° in the direction indicated by the arrow 20. During such turning movement of member 12 the cutting elements 14 thereof cut threads 21 in member 15 extending between the grooves 16 therein, such threaded member being then suitable for use as a bolt. As will be understood, the operations described with reference to FIGURES 5 to 7, inclusive, may be performed by a suitable machine, as above noted in respect to FIGURES 1 to 4, inclusive.

Figures 8, 9, 10:
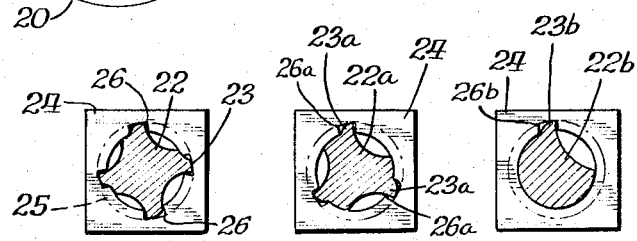
FIGURE 8 is a plan view of two cooperating thread cutting members broadly similar to those of FIGURE 1 but showing a modified form of member provided with thread cutting elements.
FIGURE 9 is a view similar to FIGURE 8 but showing a further modified form of my invention.
FIGURE 10 is a view similar to FIGURES 8 and 9 but showing another modified form of my invention.

In the modification shown in FIGURE 8, the thread cutting member 22 is provided with four equally spaced series of thread cutting elements 23, the cooperating member 24 having a bore snugly receiving member 22 and grooves 26 opening into the bore and receiving the series of cutting elements 23. With the parts assembled as shown, relative rotation thereof through approximately 90° is effective for cutting interior threads 25 in the member 24. The assembly shown in FIGURE 9 is similar to that of FIGURE 8 except that the member 22a is provided with three series of cutting elements 23a and the assembly shown in FIGURE 10 is also similar to that shown in FIGURE 8 except that the thread cutting member 22a is provided with but one series of cutting elements 23b.

It may be desirable in certain cases to cut threads of exceptional depth and absolute precision. In such cases instead of performing the threading operation with a single thread cutting member two or more such members may be used having properly related thread cutting elements. Assuming, for example, that three thread cutting members are used, each thread cutting operation is performed by not more than one rotation of the cutting member or tap as the case may be, thereby effecting a substantial saving in time over the present practice previously mentioned.

As will be understood, as above indicated, variations may be resorted to, both as to the means and the method of my invention, and I intend to include all such variations, that fall within the scope of the appended claims, in this application in which the preferred form only of my invention is disclosed.

I claim:

1. The method of producing threaded articles, which comprises disposing a first member within a second member coaxially therewith and with a snug fit therein, with one of said members having a series of thread cutting elements and the other member having a groove receiving said cutting elements, imparting relative rotation to said elements until said cutting elements again enter said groove, thereby cutting in said other member threads extending from one side of said groove, and separating said members by relative axial movement.

2. A method of producing threaded articles, comprising the steps of: disposing a first member within a second member, said second member being apertured for snug fit with said first member, one of said members having a plurality of thread cutting elements and the other of said members having a plurality of grooves for receiving said elements; and subjecting said first and second members to relative rotation through an angle of about 360° divided by the number of said elements.

3. A method of producing a threaded article, comprising the steps of: disposing a first member within a second member, said second member being apertured for snug fit with said first member, one of said members having a thread cutting element and the other of said members having a groove for receiving said element; and subjecting said members to relative rotation through an angle of about 360° such that said element re-enters said groove.

4. A method of producing threaded articles, comprising the steps of: inserting a first member into a second member, said first member having a generally cylindrical shank portion with a plurality of thread cutting elements spaced circumferentially on the surface of said shank and extending substantially parallel to the longitudinal axis of said shank, said second member having a generally circular aperture for receiving said shank, with the interior surface defining said aperture having a plurality of grooves for receiving said elements; and subjecting said members to relative rotation about a common axis through an angle of about 360° divided by the number of said elements, to cut threads in said interior surface.

5. A method of producing threaded articles, comprising the steps of: inserting a first member into a second member, said second member having a generally circular aperture, with the interior surface defining said aperture having a plurality of thread cutting elements spaced thereon, said elements extending substantially parallel to the axis of said aperture, said first member having a generally cylindrical shank portion with a plurality of grooves for receiving said elements; and subjecting said members to relative rotation about a common axis through an angle of about 360° divided by the number of said elements, to cut threads in said shank portion.

References Cited

UNITED STATES PATENTS 3,006,003 10/1961 Johnson _____ 10—86
3,234,986 2/1966 Welles _____ 85—46 X

OTHER REFERENCES

German application 1,176,450, printed August 1964, Hafner.

FRANCIS S. HUSAR, *Primary Examiner.*